United States Patent
Hessert et al.

(10) Patent No.: US 7,802,919 B2
(45) Date of Patent: Sep. 28, 2010

(54) DEVICE AND METHOD FOR REPRESENTING THE DIRECTION OF ACTION OF A WORKING MEANS

(75) Inventors: Roland Hessert, Markt Indersdorf (DE); Wilhelm Satzger, Munich (DE)

(73) Assignee: MTU Aero Engines GmbH, Munich (DE)

( * ) Notice: Subject to any disclaimer, the term of this patent is extended or adjusted under 35 U.S.C. 154(b) by 176 days.

(21) Appl. No.: 11/665,293

(22) PCT Filed: Oct. 7, 2005

(86) PCT No.: PCT/DE2005/001794

§ 371 (c)(1), (2), (4) Date: Apr. 13, 2007

(87) PCT Pub. No.: WO2006/042505

PCT Pub. Date: Apr. 27, 2006

(65) Prior Publication Data

US 2008/0013088 A1     Jan. 17, 2008

(30) Foreign Application Priority Data

Oct. 15, 2004  (DE) ...................... 10 2004 050 428

(51) Int. Cl.
*A61B 6/08* (2006.01)
*G01N 23/20* (2006.01)
(52) U.S. Cl. ........................................ 378/206; 378/71
(58) Field of Classification Search ................ 378/71, 378/73, 76, 205, 206; 356/399
See application file for complete search history.

(56) References Cited

U.S. PATENT DOCUMENTS

| | | | | | |
|---|---|---|---|---|---|
| 4,246,486 | A | * | 1/1981 | Madsen ...................... | 378/206 |
| 4,293,771 | A | * | 10/1981 | Lescrenier .................. | 378/206 |
| 4,356,400 | A | * | 10/1982 | Polizzi et al. ............... | 378/138 |
| 4,426,726 | A | * | 1/1984 | Cheetham ................... | 378/206 |
| 4,836,671 | A | * | 6/1989 | Bautista ...................... | 356/3.1 |
| 5,078,140 | A | * | 1/1992 | Kwoh ......................... | 600/417 |
| 5,316,014 | A | * | 5/1994 | Livingston .................. | 600/567 |
| 5,359,640 | A | * | 10/1994 | Fink et al. ...................... | 378/79 |
| 5,463,463 | A | * | 10/1995 | Harvey et al. ............... | 356/623 |

(Continued)

FOREIGN PATENT DOCUMENTS

DE    44 28 363 C2    2/1995

(Continued)

*Primary Examiner*—Allen C. Ho
(74) *Attorney, Agent, or Firm*—Davidson, Davidson & Kappel, LLC

(57) ABSTRACT

A device for representing the direction of action (9) of a working mechanism (3), in particular a tool or a radiation source and/or a radiation emitter, for example, of X-rays is provided. The device includes a first light source (4) which is used to produce a first beam (5). In order to represent the direction of action in a continuous manner, at least one additional light source (4') which is used to produce an additional beam (5') is provided. The light sources (4, 4') and the working device (3) can be oriented in such a manner that the first beam (5) and the additional beam (5') have a flat extension and cut in the direction of action (9) of the working mechanism (3). The invention also relates to a corresponding method.

17 Claims, 1 Drawing Sheet

U.S. PATENT DOCUMENTS

| | | | | |
|---|---|---|---|---|
| 5,657,368 A | * | 8/1997 | Rockseisen | 378/206 |
| 5,741,096 A | | 4/1998 | Olds | 408/1 R |
| 5,745,545 A | * | 4/1998 | Hughes | 378/65 |
| 6,459,760 B1 | * | 10/2002 | D'Ambrosio | 378/43 |
| 6,522,908 B1 | * | 2/2003 | Miyashita et al. | 600/409 |
| 6,718,008 B1 | * | 4/2004 | He et al. | 378/71 |
| 6,937,336 B2 | * | 8/2005 | Garcia et al. | 356/399 |
| 7,147,371 B2 | * | 12/2006 | Hecker | 378/206 |
| 2003/0185349 A1 | * | 10/2003 | Roeckseisen | 378/206 |
| 2004/0032587 A1 | | 2/2004 | Garcia et al. | 356/399 |

FOREIGN PATENT DOCUMENTS

| | | |
|---|---|---|
| DE | 295 09 546 U | 9/1995 |
| DE | 196 50 792 | 6/1996 |
| DE | 199 53 114 | 5/2001 |
| EP | 1 459 834 | 9/2004 |
| FR | 1 021 814 | 2/1953 |
| GB | 2 302 492 | 1/1997 |

* cited by examiner

DEVICE AND METHOD FOR REPRESENTING THE DIRECTION OF ACTION OF A WORKING MEANS

The present invention relates to a device for representing the direction of action of a working means, in particular a tool or a radiation source or a radiation receiver of X-rays, for example, having a first light source for generating a first ray, and a corresponding method.

BACKGROUND

In developing, manufacturing, and testing today's products, high demands are placed on the technologies used to achieve the desired manufacturing accuracy. Products of this type for which the demands on production accuracy are very high include, for example, turbine engines. In particular in the area of manufacturing and testing technology, the positionability of tools or measuring instruments, for example, X-ray diffractometers, with respect to the components is of decisive importance. To achieve high product quality and make manufacturing processes cost-effective, it is important to be able to check the orientation of these working means continuously during operation.

No possibilities are known at the present time that permit a visualization of the directions of action of tools or invisible rays, for example X-rays of an X-ray diffractometer, during operation. Instead, a light source or its light beam is folded or reflected into the spatial direction of the working means that corresponds to the direction of action. The requisite devices require a large amount of space and are of elaborate construction, since direct access is needed to the spatial direction in which the direction of action of the working means runs. Such constructions often diminish the performance spectrum of the working means, or of the entire system. Furthermore, a representation of the direction of action of the working means is normally only possible if the tool or beam operation of the working means is interrupted.

SUMMARY OF THE INVENTION

An object of the present invention is therefore to enable continuous measuring and exact control of the direction of action of a working means or device, in particular a tool or radiation source, during operation.

The present invention provides, in addition to the first light source, at least one additional light source for generating an additional beam, the light sources and/or the working means being configurable so that the first beam and the additional beam have planar divergence or expansion and intersect in the direction of action of the working means. The planar divergence of the beams generates light planes in particular. This makes it possible to mount the light sources for generating these light planes outside of the direction of action of the working means which is to be visualized, whereupon the two flat beams intersect in a straight line of intersection. According to the present invention, this straight line of intersection is brought into conformity with the direction of action of the working means in such a way that the recognizable straight line of intersection of the flat beams conforms to the spatial direction (direction of action of the working means) that is to be represented.

Since according to the present invention the light sources are situated outside of the actual working area of the tool, the spatial direction that conforms to the direction of action may be made visible even during operation of the working means. A special application is the use of the device according to the present invention for a robot-controlled X-ray diffractometer in order to be able to visualize the beam direction when the X-ray radiation is turned on. This represented spatial direction or direction of action is preferably directed in this case at the surface of the component being worked on and/or examined, so that the direction of action is always visible even with a component that moves relative to the working means.

According to a preferred embodiment of the present invention, one or all light sources may be situated with an adjusting device on a visualizing unit, so that each light source is freely adjustable in every spatial direction, under robot control or manually.

The working means is preferably also situated on an adjusting device, in particular one attached to the visualizing unit, in order to be able to adjust the light sources and the working means relative to each other with a great degree of freedom.

In order to maintain an adjustment of working means and light sources relative to each other once it has been made, the working means with the adjusting device and the visualizing unit with the light sources may be movable as a unit, for example relative to the component. To that end, the working means or the visualizing unit may be guided on appropriate positioning elements or multiple-axis robots.

A simple possibility for forming flat or curved light planes is a light source in the form of a laser line generator. In this case it may be advantageous to introduce rotating transparent disks or parallelepipeds into the beam path of the flat beams in order to drastically reduce the speckle effects of the laser line generators with the aid of the resulting alternating parallax offset. Naturally, according to the present invention the beams may also be generated by a system of optical elements, for example with appropriate light baffles. Another embodiment of the light source or light line generator provides for a light beam, for example a laser beam, to be directed at a rotatable mirror, the light beam striking the mirror in particular in the area of an axis of rotation of the mirror. If the frequency at which the mirror rotates back and forth is high enough, the reflected light beam generates a flat beam.

To clarify the representation of the spatial direction, the first beam and the additional beam may be adjusted in such a way that they project in particular an orthogonal cross, for example onto the surface of the component, whose intersection is the point of action or working point of the working means on the component. In this case the direction of action of the working means may also be made visible by changing the distance between the component and the working means, for example by repositioning the component or the working means. Naturally other optical patterns may also be generated, depending on the circumstances. More than two light sources having more than two flat beams may also be used to that end, as appropriate.

The generated beams may simply be visible light beams; i.e., they come from the wavelength range of visible light. Thus the direction of action may be visualized without additional auxiliary aids by using optical monitoring devices such as cameras or the human eye. But it is also possible using appropriate sensors to represent beams that do not come from the wavelength range of visible light, so that these may also be utilized according to the present invention.

The present invention also relates to a method for representing the direction of action of a working means, wherein a beam is generated for visualizing the direction of action of the working means. This method may be carried out in particular using the device described above. A line of intersection is formed from a first flat beam and at least one additional flat beam, the first beam, the additional beam and/or the working means being oriented in such a way that the line of intersection of the beams runs in the direction of action of the working means.

The beams are preferably generated from light having visible wavelengths, it also being possible to form the first beam and the additional beam from light of different colors, for example in order to represent certain preferred directions of the working means on the component. Furthermore, the beams in the projection may produce a pattern, in particular a cross or crosshairs.

BRIEF DESCRIPTION OF THE DRAWINGS

Further features, advantages and possible applications of the present invention are also derived from the following description of an exemplary embodiment and from the drawing without being limited thereto.

DETAILED DESCRIPTION

Figure 1:
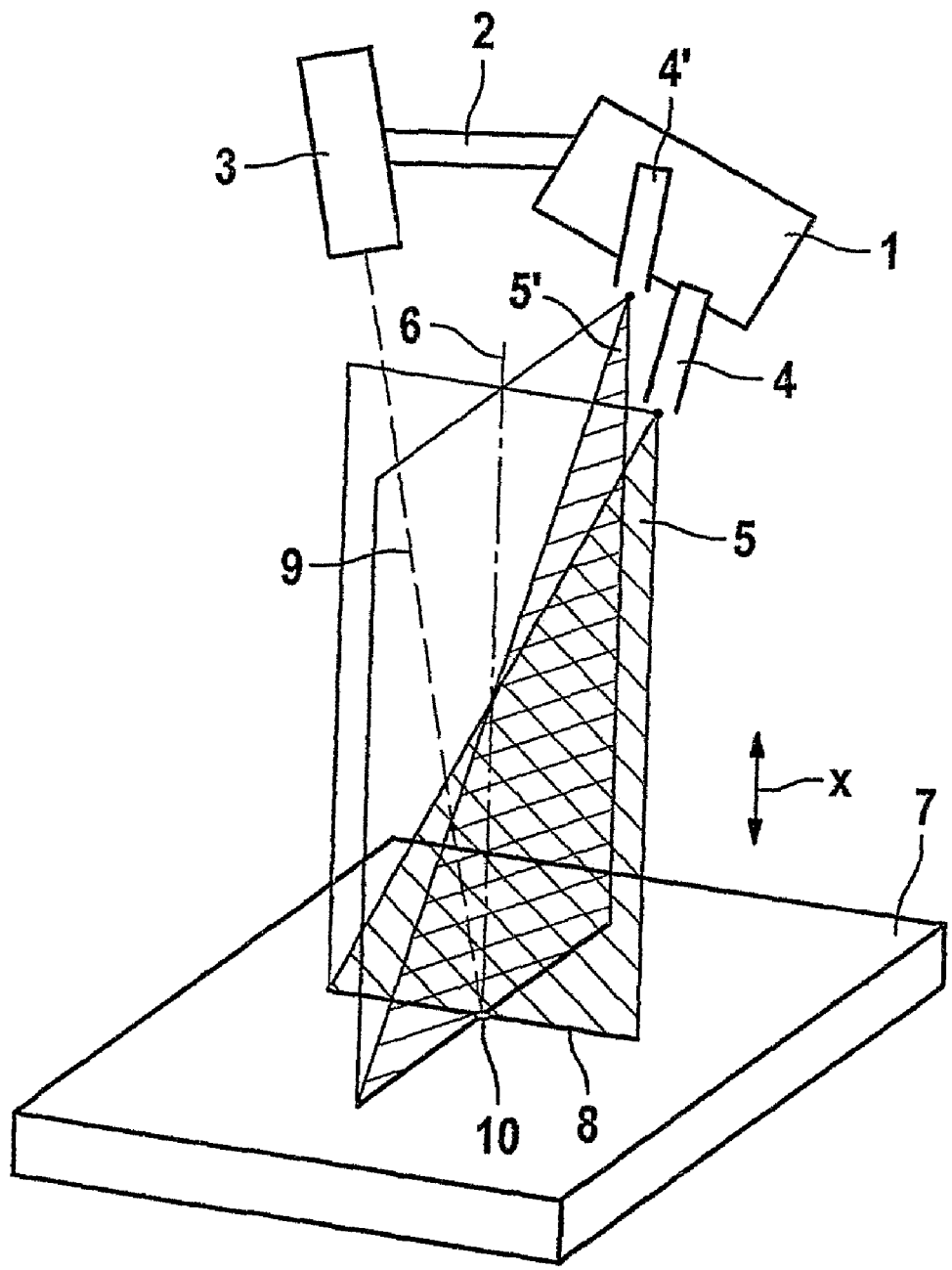

FIG. 1, the only FIGURE, schematically shows in a three-dimensional view the structure of a device according to the present invention for representing direction of action 9 of a working means 3. Working means 3 may be, for example, a tool, for example for mechanically processing a component 7, or a radiation source, or a radiation receiver for X-rays with which component 7 is to be examined. In particular, working means 3 may be a robot-controlled X-ray diffractometer, whose beam direction as the direction of action 9 to be monitored is to be represented continuously.

To that end, the device has a first light source 4 for generating a first beam 5 and a second light source 4' for generating an additional beam 5'. Both light sources 4, 4' are adjustably attached to a common optical visualizing unit 1, and generate flat beams 5, 5'. Light sources 4, 4', which are in particular in the form of laser line generators, are configured using the adjusting possibilities on visualizing unit 1 in such a way that flat beams 5, 5', which are in the form of light planes, intersect in a straight line or intersection 6. Beams 5, 5' project a cross 8 onto the surface of component 7, whose point of intersection 10 lies in straight line of intersection 6. Straight line of intersection 6 may be represented on the surface of component 7 for example by shifting component 7 in the direction of motion indicated by arrow x for various spacings between component 7 and visualizing unit 1.

To represent direction of action 9 of working means 3, straight line of intersection 6 must now be brought into conformity with direction of action 9. That is done by connecting working means 3 with visualizing unit 1 through an adjusting device 2. Using adjusting device 2 and the adjustment possibilities (not shown in further detail) for light sources 4, 4', it is possible to place direction of action 9 and straight line of intersection 6, which are still represented in FIG. 1 as different straight lines, one on top of the other. That may be done by adjusting light sources 4, 4' and/or working means 3 appropriately. After the adjustment, the unit made up of optical visualizing unit 1 with adjusted light sources 4, 4' and working means 3 may be moved as a unit relative to component 7 with the aid of positioning elements or robots (not shown), without straight line of intersection 6 and direction of action 9 becoming separated.

Thus direction of action 9 of the working means is always visible on component surface 7, even while the working means is operating. This is true even if the positions of the surface of component 7 and of working means 3 change relative to each other.

The present invention makes it possible to visualize a spatial direction that conforms to direction of action 9 of a working means 3 using the intersection of two flat light beams 5, 5' or light planes, even during operation of working means 3, since it is possible to situate light sources 4, 4' for beams 5, 5' outside of the spatial direction to be represented, and the spatial direction is generated by the intersection of these flat beams.

What is claimed is:

1. A device for identifying a direction of a tool working on a component, comprising:
   a tool for working on a component, the tool aligned in a direction with respect to the component;
   a first light source for emitting a first light beam in a first plane;
   a second light source for emitting a second light beam in a second plane, the first light source and the second light source configured such that the first light beam and the second light beam are coincident at a line of intersection that intersects the component at an intersection point;
   a visualizing unit, the first light source and the second light source adjustably coupled to the visualizing unit; and
   an adjusting unit coupled to the tool for adjusting the tool so that the direction of the tool is coincident with the intersection point, the tool and the first and second light sources being coupled together in a manner such that during operation of the tool the direction of the tool remains coincident with the intersection point, wherein the tool, the adjusting device and the visualizing unit are movable as a unit.

2. The device of claim 1 wherein the first light source and the second light source are arranged and configured such that the first light source and second light source are adjustable via the visualizing unit to vary the intersection point.

3. The device of claim 1 wherein the visualizing unit is also coupled to the tool through the adjusting device, the direction of the tool being adjustable via the visualizing unit.

4. The device of claim 1, wherein the first light source is a laser line generator.

5. The device of claim 1, wherein the second light source is a laser line generator.

6. The device of claim 1, wherein the first light beam and the second light beam form a cross.

7. The device of claim 6 wherein the cross is an orthogonal cross.

8. The device of claim 1 wherein the first and second light beams are visible light beams.

9. A device for identifying a direction of a tool working on a component, comprising:
   a tool for working on a component, the tool aligned in a direction with respect to the component;
   a first light source for emitting a first light beam in a first plane;
   a second light source for emitting a second light beam in a second plane, the first light source and the second light source configured such that the first light beam and the second light beam are coincident at a line of intersection that intersects the component at an intersection point;
   a visualizing unit, the first light source and the second light source adjustably coupled to the visualizing unit; and
   an adjusting unit coupled to the tool for adjusting the tool so that the direction of the tool is coincident with the intersection point, the tool and the first and second light sources being coupled together in a manner such that during operation of the tool the direction of the tool remains coincident with the intersection point, wherein the tool is an X-ray diffractometer.

10. The device of claim 9 wherein the X-ray diffractometer is robot-controlled.

11. A method for identifying a direction of a tool working on a component with respect to the component comprising:

emitting a first light beam in a first plane;

emitting a second light beam in a second plane, adjusting the first light beam and the second light beam until the first light beam and the second light beam are emitted such that the first light beam and the second light beam are coincident at a line of intersection that intersects the component at an intersection point; and adjusting the tool so that the direction of the tool is coincident with the intersection point and the direction of the tool intersects the line of intersection of the first and second light beams;

moving the tool, the first light beam and the second light beam during operation of the tool while maintaining the intersection of the direction of the tool and the line of intersection of the first and second light beams.

12. The method of claim 11 wherein the first and second light beams are generated from light having visible wavelengths.

13. The method of claim 11 wherein the first and second light beams produce a pattern.

14. The method of claim 13 wherein the pattern is a cross or crosshairs.

15. A device for identifying the direction of an X-ray beam with respect to a component comprising:

an X-ray device emitting an X-ray beam in a direction;

a first light source for emitting a first light beam in a first plane;

a second light source for emitting a second light beam in a second plane, the first light source and the second light source configured such that the first light beam and the second light beam are coincident at a line of intersection that intersects the component at an intersection point;

a visualizing unit, the first light source and the second light source adjustably coupled to the visualizing unit; and an adjusting unit coupled to the X-ray device for adjusting the X-ray device so that the direction of the X-ray beam is coincident with the intersection point.

16. The device of claim 15 wherein the first light source and the second light source may be adjusted via the visualizing unit to vary the intersection point.

17. The device of claim 15 wherein the visualizing unit is also coupled to the X-ray device through the adjusting device, the direction of the X-ray beam being adjustable via the visualizing unit.

* * * * *